United States Patent [19]
Ohtsu

[11] Patent Number: 5,327,613
[45] Date of Patent: Jul. 12, 1994

[54] AUTOMOTIVE WIPER APPARATUS WITH COMBINED OPERATION OF SPRAYING AND WIPING

[75] Inventor: Yoshiro Ohtsu, Zama, Japan

[73] Assignee: Nissan Motor Co., Ltd., Yokohama, Japan

[21] Appl. No.: 766,179

[22] Filed: Sep. 27, 1991

[30] Foreign Application Priority Data

Sep. 27, 1990 [JP] Japan .................. 2-255222

[51] Int. Cl.$^5$ ................ B60S 1/48; B60S 1/46
[52] U.S. Cl. ................ 15/250.02; 15/250.01; 318/DIG. 2; 239/284.1; 307/10.1
[58] Field of Search ......... 15/250.01, 250.02, 250.03, 15/250.04, 250.2, 250.35; 318/DIG. 2; 239/284.1, 284.2; 307/9.1, 10.1

[56] References Cited

U.S. PATENT DOCUMENTS

| | | | |
|---|---|---|---|
| 2,914,256 | 11/1959 | O'Shei | 15/250.02 |
| 4,698,872 | 10/1987 | Watanabe | 15/250.2 |
| 4,718,139 | 1/1988 | Okuda et al. | 15/250.2 |

FOREIGN PATENT DOCUMENTS

| | | | |
|---|---|---|---|
| 1058381 | 5/1959 | Fed. Rep. of Germany | 15/250.01 |
| 3625453 | 7/1987 | Fed. Rep. of Germany | 15/250.2 |
| 3736049 | 5/1989 | Fed. Rep. of Germany | 15/250.2 |
| 3803491 | 8/1989 | Fed. Rep. of Germany | 239/284.1 |
| 0055245 | 3/1987 | Japan | 15/250.2 |
| 0238152 | 10/1987 | Japan | 15/250.01 |

Primary Examiner—Harvey C. Hornsby
Assistant Examiner—Gary K. Graham
Attorney, Agent, or Firm—Foley & Lardner

[57] ABSTRACT

A wiping and spraying apparatus is provided for wiping away dirty articles such as dead insects caked on the surface of a windshield of an automobile. The apparatus includes a wiper blade with adjustable depression force as well as first and second reservoirs of cleaning fluid. A valve is fluidly connected with the reservoirs to selectively allow either of the fluids to be sprayed onto the windshield. The apparatus further includes a control unit to operate the apparatus by automatically operating spraying and wiping, including adjustment of the depression force, according to two modes of operation.

6 Claims, 4 Drawing Sheets

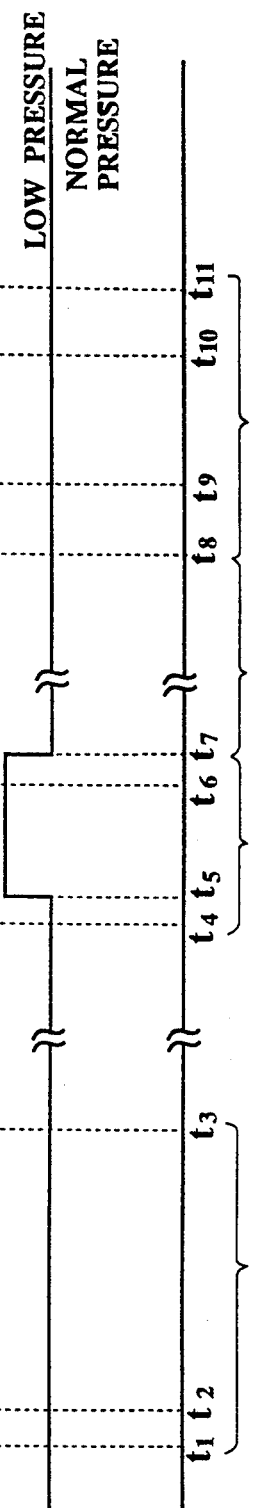

AUTOMOTIVE WIPER APPARATUS WITH COMBINED OPERATION OF SPRAYING AND WIPING

BACKGROUND OF THE INVENTION

1. Field of the Invention

The present invention generally relates to an automotive wiping method and wiper apparatus for wiping a glass surface of a vehicle by jetting a cleaning fluid. More specifically, the present invention is directed to an automobile wiping method and wiper apparatus capable of removing insects attached, caked, or stacked on a surface of a window glass of an automobile.

2. Description of the Prior Art

In general, there are various regulations for wiper apparatuses mounted on vehicles to define wiping times per minute, two different wiping speeds, wiped areas and the like.

On the other hand, with respect to depression pressure or force of a wiper blade against a glass surface, various wiper constructions have been developed in order that the wiper blade can be continuously positioned substantially perpendicular to an overall glass surface having a graceful curvature at constant depression force.

Normally, a window washing apparatus has been equipped as an auxiliary apparatus with the above-described conventional wiper apparatus, by which a cleaning fluid such as a so-called "window washer fluid" is jetted to a glass surface to be wiped. Usually, water containing surfactant at low concentration is used as the cleaning fluid.

The window washing apparatus is employed so as to drop or wipe away dirty articles or mud attached or caked on a window glass surface in such a manner that when the cleaning fluid is jetted from nozzles provided on a hood in front of the windshield to the window glass surface, the surface and the dirty articles are wetted, and thereafter the dirty articles or mud attached on the surface may be wiped away together with the cleaning fluid. When the window washing switch is manipulated, the washing fluid pump is turned ON and the window washing fluid starts to be jetted to the window glass. After the commencement of the window-washing-fluid jetting operation, the wiper drive motor is energized so that the wiper blades are reciprocated two to four times. After the window washing fluids have been jetted several times, the window washing operation is automatically stopped.

The operation of such a conventional window washing apparatus is described in, for instance, Japanese KOKAI Disclosure patent application No. 55-4238 opened in 1980.

On the other hand, there are many possibilities that while driving an automobile outside cities, e.g., roads through rice fields, a variety of small insects or bugs will collide with the glass surface of the windshield and are smashed thereon. As a result, dead insects and their body fluids will become attached or affixed to the surface of the windshield.

Since the dead insects and body fluids attached on the surface are quickly dried and thus caked while driving the automobile, they can not be easily wiped away even when the above-described window washing operation is performed.

The dead insects and body fluids attached or caked on the surface of the windowshield may cause the appearance of the automobile to be deteriorated, and also may narrower a may also narrow the field of view for the driver of the car.

SUMMARY OF THE INVENTION

The present invention has been made in an attempt to solve the above-described problem, and therefore has an object to provide an automotive wiper apparatus capable of removing dirty articles (e.g., dead insects) or mud attached or caked on a surface of a glass window.

To achieve the above-described object, an automotive wiper apparatus, according to the present invention, comprises:

means (5:7A) for wiping at least a surface of an object (3) employed in an automobile (1) by a wiper blade (5);

means (100) for jetting at least a first cleaning fluid to at least a dirty article attached on said surface of the object (3); and, means (200) for controlling depression force of said wiper blade (5) against the surface of the object (3) for a predetermined time period, whereby said dirty article attached on the surface of the object (3) is wetted by the first cleaning fluid and wiped by the wiper blade (5) at lower depression force than predetermined depression force of the wiper blade (5).

Furthermore, according to the present invention, a method for wiping away a dirty article attached on a surface of an object (3) employed in an automobile (1), comprising the steps of:

jetting a first cleaning fluid to at least said dirty article attached on the surface of the object (3);

firstly wiping the surface of the object (3) by a wiper blade (5), while reducing depression force of the wiper blade (5) against the surface of the object (3), as compared with predetermined depression force of said wiper blade (5), and also jetting said first cleaning fluid to the dirty article;

interrupting said jetting of the first cleaning fluid and said wiping of the wiper blade (5);

returning said reduced depression force of the wiper blade (5) against the surface of the object (5) to said predetermined depression force;

moistening said dirty article with said first cleaning fluid; and, wiping away the moistened dirty article by the wiper blade (5) at said predetermined depression force, while secondly jetting a second cleaning fluid to at least the moistened dirty article.

DETAILED DESCRIPTION OF THE PREFERRED EMBODIMENTS

Basic Idea

Before describing various preferred embodiments of the automotive wiper apparatus, a basic idea of the present invention will now be described with reference to FIG. 1.

An automotive wiper apparatus of the present invention is mainly constructed of a fluid jet means 100, a main control means 200, a wipe-blade depression control means 300, a window washing switch 23A and a caked insect removing switch 23B.

When dirty articles such as dead small insects or mud are attached and/or caked on a glass surface of a window, e.g., a windshield of an automobile while driving the automobile, the window washing switch 23A is turned ON so as to jet a cleaning fluid to this glass surface of the windshield by the fluid jet means 100 under control of the main control means 200. At this time, the wiper-blade depression control means 300 is controlled by the main control means 200 in such a manner that the depression force or pressure of the wiper blades (not shown) is lowered for a predetermined time period.

Then, while the depression force is lowered, the wiper blades are operated to spread the jetted cleaning fluid over the glass surface of the windshield, so that a liquid layer of this cleaning fluid is formed on the glass surface, and thereafter the dead insects or mud becomes wetted or is moistened. As a result, the dead insects or mud may be brought into a floating condition, namely may be separated from the glass surface.

This floating condition of the dead insects or mud is maintained for a predetermined time period. After a predetermined time period has passed, the depression force of the wiper blades is returned to the normal force, namely is increased to the normal depression pressure, and therefore when these wiper blades are operated, these mud and dead insect layers can be completely wiped away.

Wiper Driving Mechanism of First Wiper Apparatus

Figure 2:
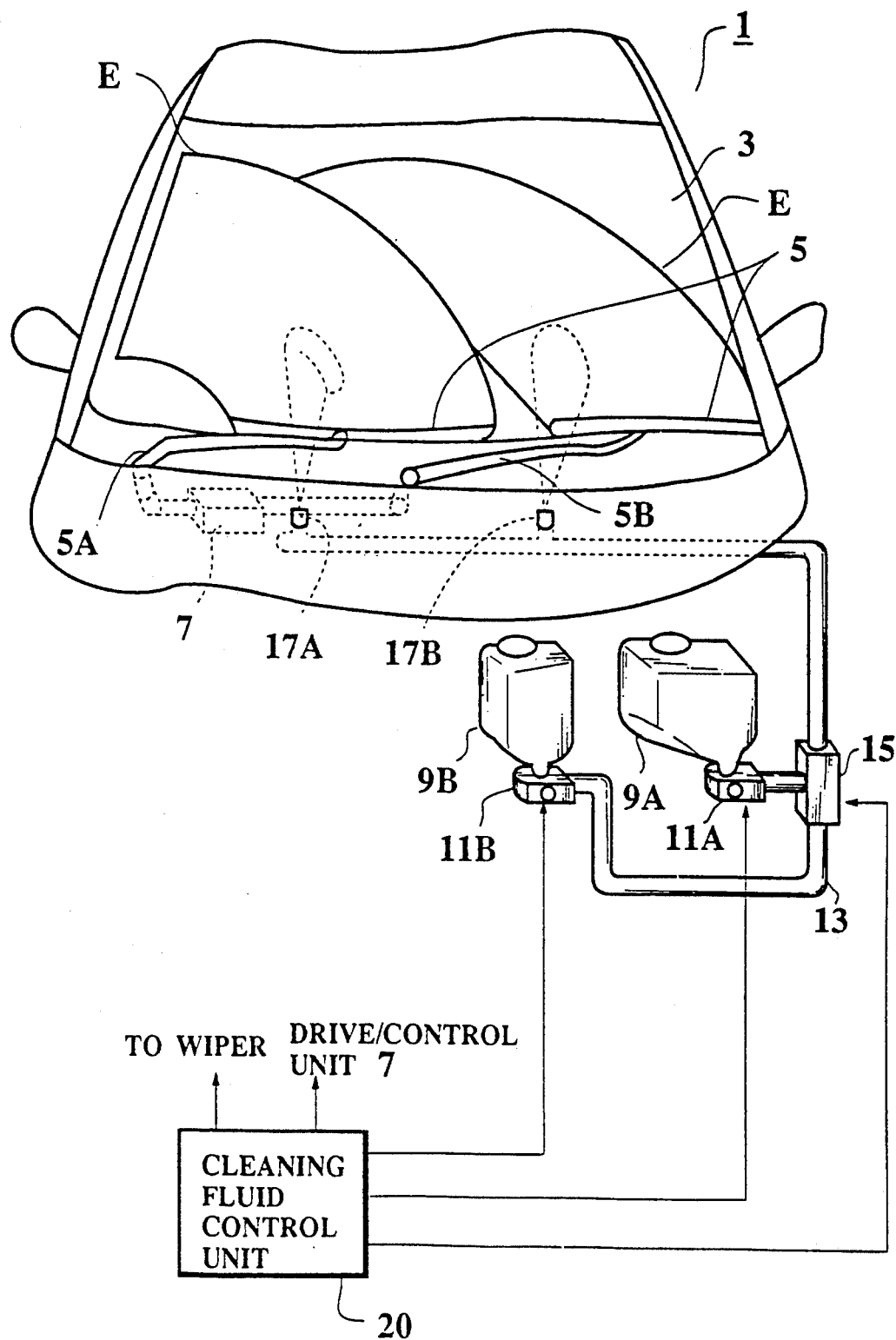
FIG. 2 is an illustration of a major arrangement of an automotive wiper apparatus according to a preferred embodiment of the present invention.

FIG. 2 represents a major construction (i.e., wiper driving mechanism and washing fluid supply mechanism) of an automotive wiper apparatus according to a preferred embodiment of the present invention.

As apparent from FIG. 2, this automotive wiper apparatus is employed so as to wipe away rain and also dirty articles such as dead insects attached on a glass surface of a windshield 3 of an automobile 1.

Wiper blades 5 are provided in such a manner that a rubber blade of each wiper blades 5 is positioned substantially upright the glass surface 3 of the windshield. A center portion of the respective wiper blades 5 is mechanically supported by a wiper arm 5A or a wiper arm 5B. While reciprocating these wiper arms 5A and 5B in a fan shape, the wiper blades 5 are swung over the glass surface B in a fan shape.

Figure 1:
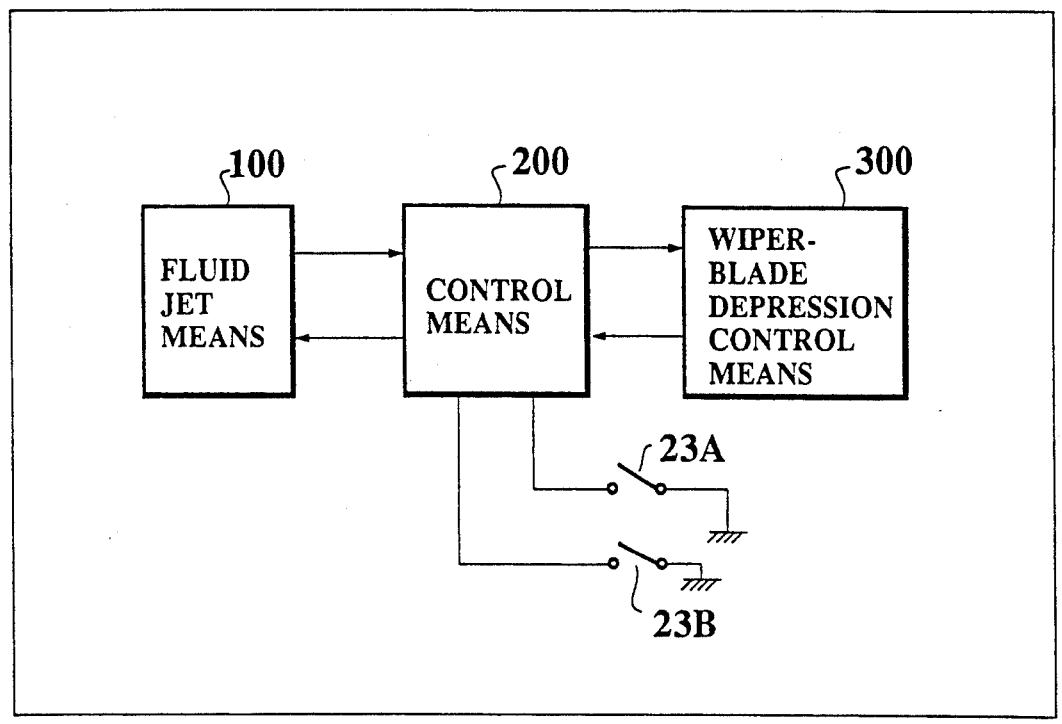
FIG. 1 schematically represents a basic idea of an automotive wiper apparatus according to the present invention.

Inside each of these wiper arms 5A and 5B, a wiper-blade depression control mechanism (not shown in detail) corresponding to the wiper-blade depression control means 300 of FIG. 1, is assembled so as to control the depression force on pressure of these wiper blades 5 against the glass surface 3 of the windshield. A wiper drive/control unit 7 is employed with the respective wiper arms 5A and 5B the depression pressure or force of the wiper blades 5 is varied under control of the wiper drive/control unit 7. The wiper-blade depression control mechanism per se is known in the art, for instance, U.S. Pat. No. 4,718,139 to Okuda et al, assigned to the same assignee, and may be arranged by a spring (not shown) and a depression force control motor 7B (see FIG. 3), or a solenoid (not shown either).

The wiper drive/control unit 7 is so constructed of a drive section including a wiper motor 7A (see FIG. 3) for swinging the wiper arms 5A and 5B and a link mechanism (not shown); and also a control section for changing the depression force exerted by the wiper-blade depression control mechanism.

Washing Fluid Supply Mechanism of First Wiper Apparatus

A washing fluid supply mechanism of the first automotive wiper apparatus will now be described with reference to FIG. 2.

The washing fluid supply mechanism is so constructed that a so-called "window washing fluid" is jetted to the wiping area "E" of the windshield 3 and also another cleaning fluid is jetted thereto in order to wipe away or remove the above-described mud or dead insect layer from this wiping are "E". To this end, a first fluid tank 9A is employed to contain therein the "window washing fluid", whereas a second fluid tank 9B, a capacity of which is approximately a half of that of the first fluid tank 9A, is further employed to contain therein another cleaning fluid for removing the dead insect layer. First and second pumps 11A and 11B are mounted at down streams of the first and second fluid tanks 9A and 9B, respectively.

Also, a fluid stream control valve 15 is provided at down streams of the first and second pumps 11A and 11B, by which either the "window washing fluid" or the cleaning fluid is selectively flown via a fluid transport tube 13 and this control valve 15 to nozzles 17A an 17B. It should be noted that this control valve 15 is so energized as to pass the "window washing fluid" therethrough in the normal state. Two nozzles 17A and 17B are separated from each other and outlet ports thereof (not shown in detail) are directed toward the wiping area "E" of the windshield 3.

Cleaning Fluid Control

Figure 3:
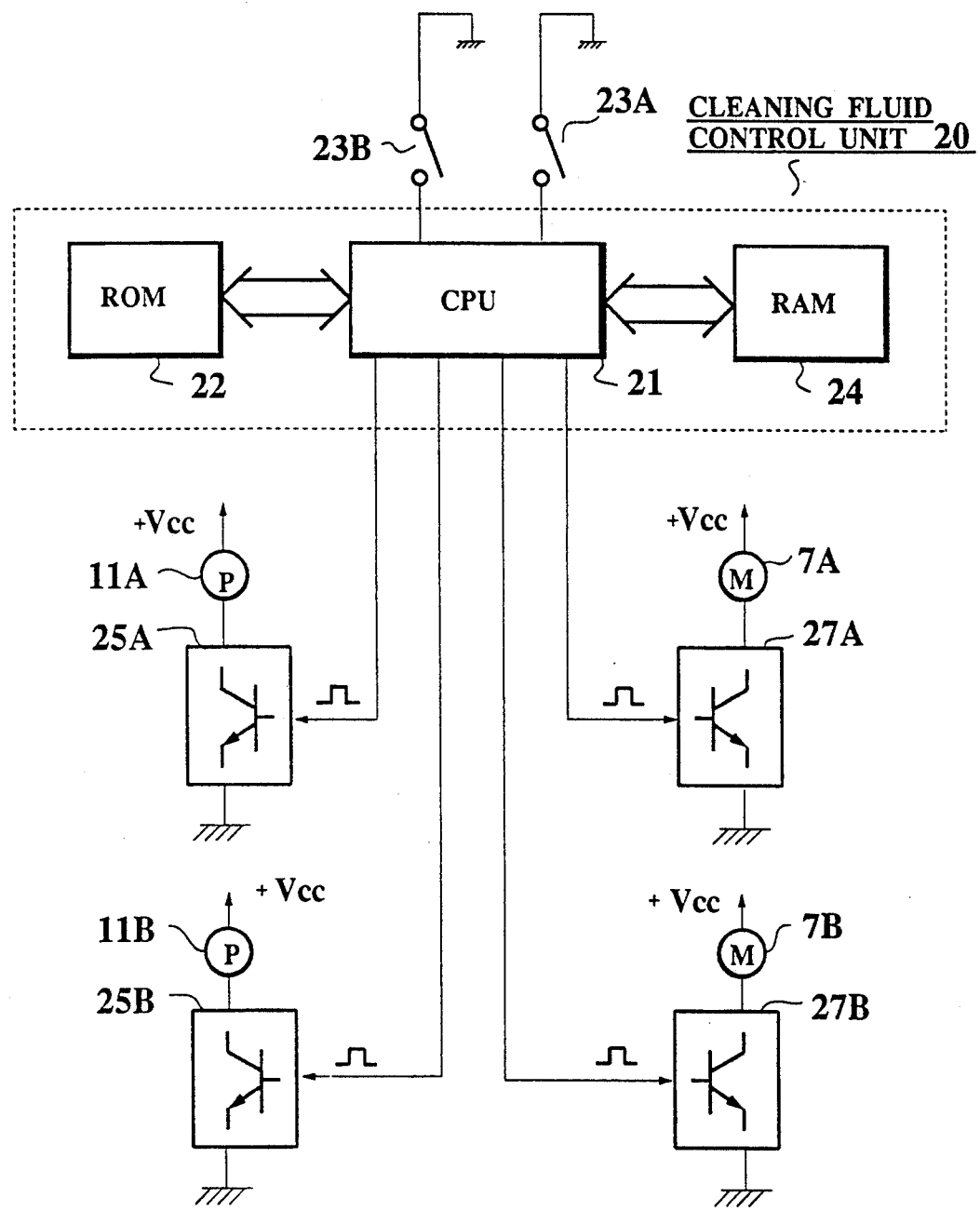
FIG. 3 is a schematic block diagram for showing a control system employed in the automotive wiper apparatus of FIG. 2; and, FIG. 4 shows a timing chart for explaining the caked insect removing operation in connection with the normal window washing operation performed in the automotive wiper apparatus of FIG. 2.

Referring now to FIG. 3, a cleaning fluid control operation by cleaning fluid control unit 20 employed in the first automotive wiper apparatus will be described.

Both the window washing switch 23A and the caked insect removing switch 23B are coupled to a central processing unit 21 employed in this cleaning fluid control unit 20. A first drive circuit 25A constructed of, for example, a bipolar transistor for driving the first fluid pump 11A, is coupled to CPU 21. Also, a second drive circuit 25B for driving the second fluid pump 11B, a third drive circuit 27A for driving the wiper motor 7A, and a fourth drive circuit 27B for driving the wiper-blade depression control motor 7B are coupled to CPU 21.

A ROM (read-only memory) 22 is further employed in this cleaning fluid control unit 20, which previously stores a program to control the entire system operation of the first automotive wiper apparatus. A RAM (random access memory) 24 is also employed in this cleaning fluid control unit 20.

The cleaning fluid operations effected by the first automotive wiper apparatus will now be described with reference to a timing chart shown in FIG. 4.

For a better understanding of the featured insect removing operation according to the present invention, a timing control for the normal cleaning operation by the first wiper apparatus will now be firstly described with reference to a left portion of this timing chart of FIG. 4.

In the normal fluid cleaning operation, when the window washing switch 23A is turned ON at a time instant "t1", the first fluid pump 11A is substantially simultaneously energized so that the normal cleaning fluid stored in the first fluid tank 9A is pumped up and supplied via the fluid transport tube 13 and the fluid control valve 15 to the first and second nozzles 17A and 17B. As a result, the normal cleaning fluids are jetted toward the wiping area "E" of the glass surface of the windshield 3. After a predetermined delay time from the energization (t1) of the first fluid pump 11A, the wiper motor 7A starts to be driven at a time instant "t2" whereby the wiper blades 5 are swung three or four times over the glass surface of the windshield 3. Then, the normal cleaning operation is completed at a time instant "t3". It should be noted that neither the second fluid pump 11B, nor the wiper-blade depression control motor 7B is operated during this normal cleaning operation, and the entire normal cleaning operation is executed under control of the program stored in ROM 22 by CPU 21.

When the caked insect removing switch 23B is turned ON at a time instant "t4" the second fluid pump 11B is energized so that another cleaning fluid for removing the dead insects, which has been stored in the second fluid tank 9B, is pumped up from this fluid tank 9B. Then, this cleaning fluid is similarly supplied via the fluid transport tube 13 and the fluid control valve 15 to the nozzles 17A and 17B. As a result, the mud or dead insects attached and/or caked on the glass surface of the windshield 3 are jetted by this cleaning fluid and thereafter a cleaning fluid layer with the dirty articles starts to be formed (will be discussed later).

At a next time instant "t5", the wiper motor 7A is driven under control of CPU 21 in accordance with the program stored in the ROM 22 of the cleaning fluid control unit 20. At the substantially same time (i.e., "t5"), since the blade pressure control motor 7B is energized under control of CPU 21, the depression force of the wiper blades 5 is decreased or reduced. The supply of this insect removing cleaning fluid is continued until the caked insect removing switch 23B is turned OFF at a time instant "t6".

Under such a depression force control operation, the mud or dead insects attached or caked on the glass surface of the windshield 3 are wiped by the wiper blades 5 at lower depression force than the normal depression force for a predetermined time period, e.g., 3 seconds (namely, two reciprocating operations of the wiper blades 5). When the wiper motor 7A is stopped at a time instant "t7", the depression control motor 7B is simultaneously stopped under control of CPU 21.

During a time period from the time instant "t4" (turning ON the caked insect removing switch 23B) to the time instant "t5" (stopping the wiper motor 7A and blade depression control motor 7B), a cleaning fluid layer with the mud or dead insects may be formed on the glass surface of the windshield 3, because of both the supply of the above-described insect removing fluid and also lower blade depression force.

Upon formation of such a cleaning fluid layer, the caked or attached dead insects or mud are gradually and sufficiently moistened for a predetermined time period, e.g., 40 seconds.

After this moistening time period, the wiper motor 7A is again driven under control of CPU 21 in accordance with the execution of the program at a time instant "t8". At this time, the depression force of the blades 5 is already returned to the normal depression force. The wiping operation is performed until a next time instant "t9" without jetting the normal cleaning (washing) fluid to the wetted or moistened cleaning fluid layer. After this time instant "t9" has passed, the normal washing fluid is newly jetted to this wetted or moistened cleaning fluid layer by energizing the first fluid pump 11A and the wiper blades 5 start to be swung.

This wiping operation is continued until a time instant "t10", during which the wiper blades 5 are reciprocated three or four times with receiving the normal washing fluids from the nozzles 17A and 17B. After this time instant "t10", the first fluid pump 11A is turned OFF, but the wiper motor 7A is still turned ON so that the wiping operation is continued until a time period "t11".

As a consequently, the mud or dead insects attached or caked on the glass surface of the windshield 3 can be completely removed by the first automotive wiper apparatus in accordance with the above-described series of insect removing cleaning operation, that is, forming of the cleaning fluid layer, moistening of the caked insect layer, and wiping away of the moistened insect layer.

Modifications

As apparent from the foregoing descriptions, the present invention is not limited to the above-described preferred embodiment, but may be modified, changed and substituted without departing from the technical spirit and scope of the present invention.

For instance, the above-described time periods, e.g., moistening period may be varied in accordance with the basic idea of the present invention. The sorts of cleaning/insect-removing fluids may be substituted by other types of cleaning fluids.

Moreover, in the construction of the first wiper apparatus shown in FIG. 2, both the first and second fluid pumps 11A and 11A may be substituted by newly employing second and third fluid control valves (not shown), and also the first fluid control valve 15 may be substituted by either the first fluid pump 11A or the second fluid pump 11B, whereby only a single fluid pump 11A or 11B can selectively transport two different cleaning fluids to the nozzles by selectively energizing the second and third fluid control valves.

Although the first automotive wiper apparatus was applied to wipe away the caked dirty articles on the windshield, this wiper apparatus may be applied to other windows and also glass surfaces of head lamps of automobiles.

What is claimed is:

1. An automotive wiper apparatus comprising:
means for wiping a surface of an object employed in an automobile, said means for wiping including at least one wiper blade having an adjustable depression force;
means for jetting a first cleaning fluid and a second cleaning fluid onto the surface of said object;
means for controlling both the wiping means and the jetting means under two modes of operation such that in a first mode of operation, said jetting means sprays the first cleaning fluid onto the surface of said object and said wiper blade is applied to said surface in a wiping motion under a first depression force;
and wherein under a second mode of operation, said cleaning fluid onto the surface of said object over a predetermined time period, and said wiper blade to be applied to said surface in a wiping motion under a second depression force which is less than said first depression force.

2. An automotive wiper apparatus according to claim 1, wherein said predetermined time period is approximately 40 seconds.

3. An automotive wiper apparatus according to claim 1, wherein the surface of said object is a glass surface of a windshield of the automobile.

4. An automotive wiper apparatus according to claim 1, further comprising:
   a first fluid tank for containing said first cleaning fluid;
   a second fluid tank for containing said second cleaning fluid, and communicated with said first fluid tank by means of a fluid transport tube; and
   a fluid selecting valve provided between said fluid transport tube and said jetting means, for selecting one of said first and second cleaning fluids, wherein said control means further controls operations of said fluid selecting valve.

5. An automotive wiper apparatus according to claim 1, wherein said first cleaning fluid is water containing surfactant.

6. An automotive wiper apparatus comprising:
   means for wiping a surface of an object employed in an automobile, said means for wiping including at least one wiper blade having an adjustable depression force;
   means for jetting a first cleaning fluid and a second cleaning fluid onto the surface of said object;
   means for controlling both the wiping means and the jetting means under two modes of operation such that in a first mode of operation said jetting means sprays the first cleaning fluid onto the surface of said object and said wiper blade is applied to said surface in a wiping motion under a first depression force which is sufficient to substantially remove said jetted cleaning fluid after a few wipes; and
   wherein under a second mode of operation, said controlling means causes said jetting means to spray the second cleaning fluid onto the surface of said object, and said wiper blade to be applied to said surface in a wiping motion under a second depression force which is less than said first depression force, thereby causing said second cleaning fluid to be spread onto said surface to form a layer of cleaning fluid thereon;
   said controlling means further causing said wiper blade in said second mode of operation to be applied to said surface in a wiping motion under said first depression force after a predetermined period of time sufficient to allow articles of dirt to dislodge.

* * * * *